SHIFT REGISTER DEVICE

Filed Oct. 23, 1957 2 Sheets-Sheet 1

INVENTORS:
Peter S. Glaser
Walter G. Edwards
James F. Hudson
Louis A Kline
By John J. Matlago
Attorneys

SHIFT REGISTER DEVICE

Filed Oct. 23, 1957 2 Sheets-Sheet 2

INVENTORS:
Peter S. Glaser
Walter G. Edwards
James F. Hudson
By Louis A. Kline
John J. Matlago
Attorneys.

United States Patent Office 3,011,159
Patented Nov. 28, 1961

3,011,159
SHIFT REGISTER DEVICE

Peter S. Glaser, Culver City, Walter G. Edwards, Manhattan Beach, and James F. Hudson, Hermosa Beach, Calif., assignors to The National Cash Register Company, Dayton, Ohio, a corporation of Maryland Filed Oct. 23, 1957, Ser. No. 691,927
15 Claims. (Cl. 340—174)

This invention relates to information registers as employed in computer devices, and more specifically to shift registers of a type usable in electronic digital computer devices.

In computer devices, shift registers serve to receive an information bit from an input means and to shift or transfer the information bit through a plurality of stages or units for subsequent use at an output of the register. In digital computers, the information bits commonly are each represented by one or the other of two conditions generally characterized by the two stable states of a bistable device or means, or opposite states of a two-state physical phenomenon such as presence or absence of flow of an electric current. In the computer art, the two opposite conditional or physical states have conveniently been graphically represented by the symbols "1" and "0" widely employed as the digits in binary arithmetic. In the present disclosure and invention, the opposed remanent magnetization states of bistable magnetic elements or cores, now commonly used in information storage and translation devices, are so symbolized and employed. An information bit to be entered into and shifted through the register may graphically be represented by the numeral one, and its entry into and registration upon a unit of the register will be evidenced by the magnetic core of that unit assuming or existing in a selected one of the two stable states herein designated and represented by the symbol "1." The opposite remanent magnetic state of a core, symbolized by "0," will then represent the absence of a bit in the unit of the register containing that core. Further details of the characteristics of bistable magnetic cores and means including windings on the cores for coercing, that is, for forcing or "driving" them from either remanent state to the other, are set forth in a wide variety of prior art literature.

The present invention comprehends a self-sequencing register device having a plurality of register sections or units, and a control unit. Each register unit comprises a magnetic core of the character mentioned, with appropriate windings or "coils" (which may be only part of a single turn coil), as an information bit or digit registering and storing element. Each register unit of the register device comprises a low frequency transistor acting in conjunction with the core of the unit in a novel and useful manner. Operations of the register unit are controlled by the control unit, which essentially comprises two additional cores each having coils and an associated transistor. The arrangement is such that, with proper potentials supplied to the components, an information bit is registered upon the first register core by a bit-representing input pulse which may conveniently also contemporaneously serve to set (coerce) the remaining register cores to "0" and initiate operation of the control unit. Thereafter, an output or control pulse produced by the control unit initiates or "triggers" conduction through the transistor of the first register unit, whereby a bit-shifting pulse is produced which removes registration of a bit from the first register unit, registers the bit in the next suceeding register unit, and initiates a new cycle of operation of the control unit. The control unit then produces another control pulse which is effective to activate the transistor of the second register unit, that transistor then producing a pulse which is effective to remove registration of the bit from the second unit and enter it in the next succeeding unit and again set the control unit into operation. The action is then substantially cyclically repeated, the bit registration being shifted one unit per cycle of actions. Final disposition of the bit is dependent upon the function to be served; it may be detected as an output of the last unit of the register, may merely be removed from the terminal unit of the register and not further utilized, or it may be reinserted in the first unit of the register, to be recirculated. By novel use of transistors in conjunction with the register cores, employment of additional or "temporary storage" cores between the bit-register cores is obviated. Further, the register is self-actuating once a digit has been entered therein, and does not require external clock operation.

It is, then, a primary object of the invention to provide an improved shift register device.

Another object of the invention is to provide a shift register which does not require delay lines nor temporary-bit-storage means between successive units of the register.

A subsidiary object of the invention is to provide a self-sequencing shift register device.

Another object is to provide a novel information storage unit.

Another object of the invention is to provide a novel bistable apparatus capable of rapid shift from a first stable state to a second stable state, and a relatively slow shift from the second state to the first state.

Other objects and advantages of the invention will hereinafter be made evident in the claims and in the following description of a preferred exemplary physical embodiment of the invention as schematically depicted in the accompanying drawings. In the drawings:

Figure 1:
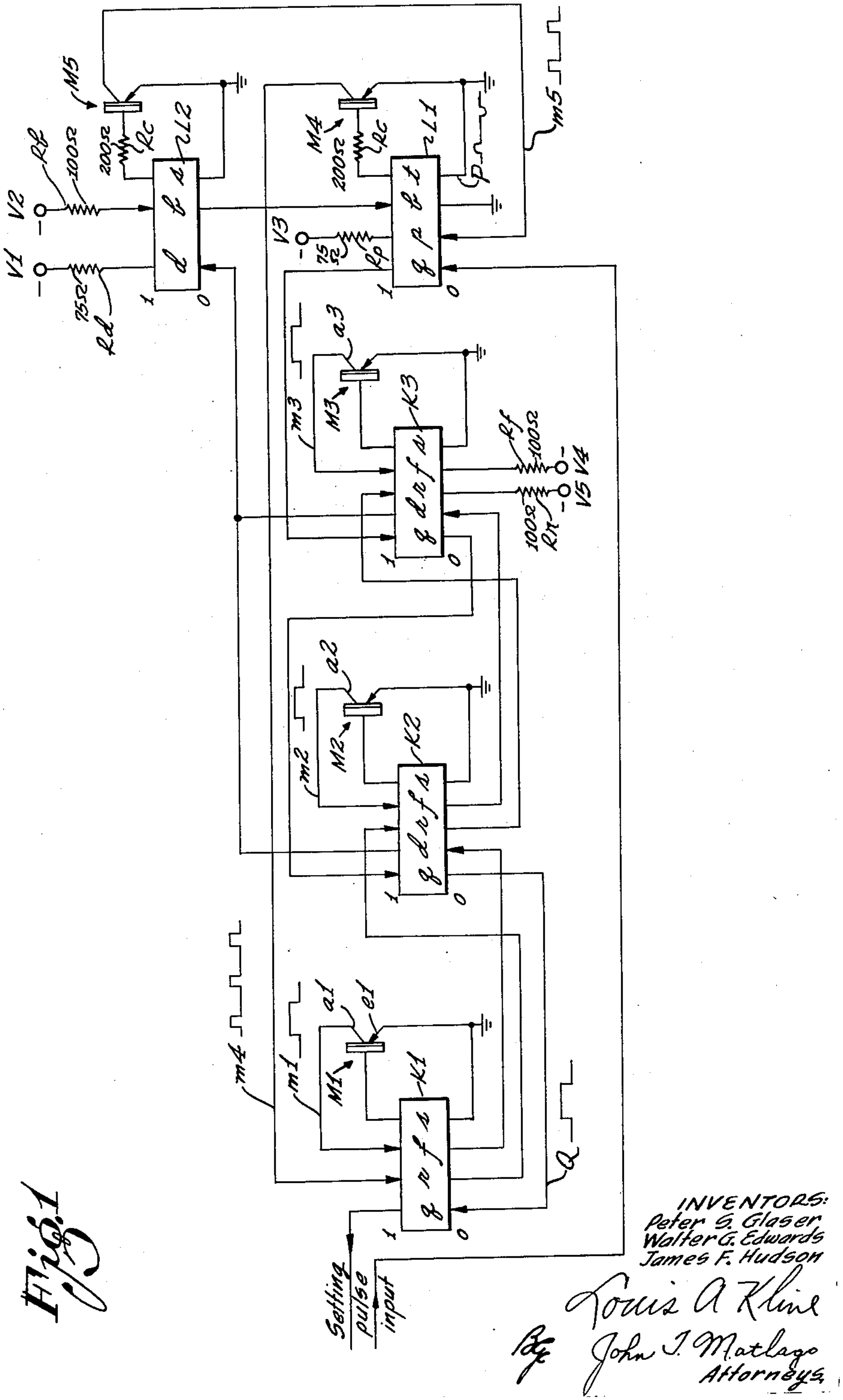
FIG. 1 is a circuit diagram, partly schematic, depicting the cores, transistors, and circuit wiring of a shifting register.

Referring to FIG. 1, there is schematically depicted a shifting register device comprising two control unit cores L1, L2, and three bit-register cores K1, K2, K3. The cores, which may be of any suitable type and, for example, may be 3/16" diameter and of 40 turns of 1/8 mil "Moly Permalloy," are for reasons of clarity of illustration depicted as rectangles. Each core has windings or coils each of which is represented by a lower case alphabetical letter within the respective rectangle. As is well known, the windings or coils may each comprise more or less than one full turn. Electrical leads to the coils are as indicated, terminating at the letters designating the respective coils; and the significant coil current flow directions are indicated by upwardly and downwardly directed arrow points. The coil connections are such that any current flowing into a coil in the "upward" direction indicated by an upwardly directed arrow point tends to drive or coerce the respective core to "1," and any current flowing into a core in the "downward" direction indicated by a downwardly directed arrow point tends to drive or coerce the respective core to "0." Setting coils, used for initially setting the register cores and starting operation of the register, are denoted by the letter *q*, "read" coils are denoted by the letter *r*, feedback coils by *f*, sensing coils by *s*, biasing coils by *b*, drive coils by *d*, a controlling drive coil on core L1 by *p*, and sensing coil on core L1 by the letter *t*.

Each of the cores K1, K2, K3, L1, and L2 has associated therewith a respective one of transistors M1, M2, M3, M4, and M5, as indicated. Any suitable transistors may be used, for example, "Raytheon 2N114" for M4 and M5 and "G.E. 2N187A" for M1, M2, and M3. The transistors are connected in the circuitry as shown, each with its emitter, such as *e*1 of transistor M1, grounded; and with the emitter and base connected to a respective sensing coil on the associated core. The arrangement and connections to the sensing coils are such that a voltage generated in a sensing coil (such as coil *s* of core K1) by a current starting to flow in the "downward" direction through another coil (such as *r* of core K1) on the same core will trigger the respective transistor (such as K1) into conduction. Transistors M4 and M5 are provided with current limiting resistors R*c* in their base circuits to control lengths of periods conduction; hence when triggered, their respective collector currents will flow but for a relatively short time, for example 2 μsec. Transistors M1, M2, and M3 are of low-frequency type and do not have limiting resistors in their base circuits. This permits these transistors to saturate and provides for an effect commonly termed "hole storage" which is utilized in a manner and for a purpose hereinafter explained.

Figure 2:
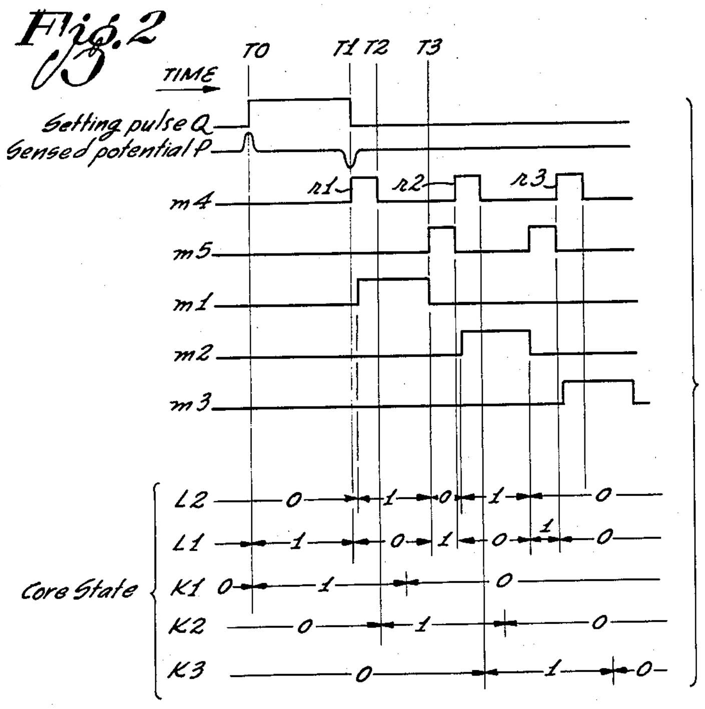
FIG. 2 is a set of graphs and waveforms explanatory of certain features of operation of the apparatus of FIG. 1.

Each of transistors M1, M2, and M3 has its collector terminal (such as *a*1 of M1) connected to a respective feedback coil *f*, the connection being, as indicated by the arrow points, such that collector current tends to drive the respective associated core to "0." The read coils *r* on cores K1, K2, and K3 are connected in series and such that applied control or "shift" pulses supplied by a control unit pass concurrently through those coils in the direction indicated, and tend to drive the respective cores to "0." It will be noted that the input pulse to the read coils is derived from the collector output of transistor M4. This pulse is indicated at *r*1 on waveform *m*4 (FIG. 2). Hence when M4 is triggered into conduction, the read coils of all of the bit-register cores K1, K2, and K3 will be energized by current from a potential source V5, to which the read coil circuit is connected through a current regulating resistor R*r*.

Each of cores L1 and L2 has a biasing coil *b*, normally energized in the direction indicated to tend to maintain the respective cores in "0" state. For this purpose the two biasing coils may be serially connected through a current regulating resistor R*b* to a suitable source of potential V2, as indicated in FIG. 1. Transsistor M5 has its collector connected as indicated through the drive coil *p* on core L1 to the negative pole of a potential source V3, the arrangement and apparatus characteristics being such that when M5 conducts, the output pulse therefrom will overcome the normal bias on core L1 and will temporarily drive that core from "0" to "1." The bias is such that it will return L1 to "0" upon termination of the output pulse from M5.

The collector terminal of transistor M1, indicated at *a*1, is serially connected through feedback coil *f* on core K1, coil *d* on K2, coil *d* on L2 and resistor R*d* to the negative pole of a potential source V1. The connections, as indicated, are such that when M1 is triggered into conduction, the collector current pulse through M1 tends to drive K1 to "0," K2 to "1," and L2 to "1." Similarly, the collector *a*2 of transistor M2 is serially connected through feedback coil *f* on K2, coil *d* on K3, coil *d* on L2 and resistor R*d* to the negative pole of potential source V1. These connections, as indicated by the arrow points, are so arranged that when M2 is triggered into conduction the collector current pulse through M2 tends to drive K2 to "0," K3 to "1," and L2 to "1." The circuit components are of such values that both of the mentioned output pulses from M1 and M2 will drive L2 from its normal "0" state to "1," temporarily overcoming the steady "0" state bias applied thereon by coil *b*. Resistor R*d* is of value chosen to insure passage of current of proper intensity to accomplish this. In each instance, the bias will return L2 to "0" upon termination of the output pulse from M1 or M2. The collector terminal *a*3 of transistor M3 is connected through feedback coil *f* on core K3 and a current regulating resistor R*f* to the negative pole of a potential source V4, as indicated, so that upon triggering of M3, core K3 is driven to "0." It will be understood that the positive poles of the several potential sources may be connected to ground, and that a single potential source may be employed, as is known in the art.

Core L1 and register cores K1, K2, and K3 are each provided with a setting coil *q*. These coils should be concurrently energized in the indicated directions to concurrently drive cores K1 and L1 to "1" and cores K2 and K3 to "0." Accordingly, the setting coils may be connected in series in the directions indicated, to be energized by a setting pulse provided by any suitable source (not shown). This pulse may represent an information bit (for example, the digit one) to be written into the register; and is passed through the setting coils in the "directions" indicated in FIG. 1.

With the described arrangement of apparatus, application of a setting pulse (represented by the elevation in waveform Q in FIG. 2) to the setting coils *q* will drive K1 to "1" (if K1 is not already in "1" state), will drive both K2 and K3 to "0," and will cause L1 to temporarily reverse from "0" to "1." As L1 and K1 are driven to "1" at a time indicated by T0 in FIG. 2, voltages are induced in the coils on those cores. The voltages thus induced at time T0 are of no special significance nor consequence in operation of the apparatus since they are of incorrect polarity to trigger into conduction either of transistors M1, M2 or M3. The polarity is indicated at time T0 in waveform P (FIG. 2). At the termination of the setting pulse (time T1 in FIG. 2), the bias on L1 returns that core to "0," inducing a voltage in coil *t* thereon. The induced voltage, represented on waveform P at time T1, is of the proper polarity to trigger M4 into conduction. M4 conducts a short-duration pulse (about 2 μsec., for example) which is represented as the first pulse (*r*1) of waveform *m*4 in FIG. 2. This control pulse, which is of short duration due to the action of current limiting resistor R*c* in the base circuit of M4, follows the path previously described, through each of coils *r* of the bit register cores K1, K2, K3, and induces a voltage in the sensing coil *s* on core K1.

The voltage induced in coil *s* on core K1 is of the proper polarity to initiate conduction in M1. The resultant collector current through M1 is, as it increases, opposed by the inductive or loading effect of coil *s* on K1; and as a result core K1 is "turned over" relatively slowly and does not complete the transition from "1" to "0" until sometime after the control pulse from M4 has become extinct. It will be noted that the relatively short duration control pulse from M4 (of about 2 μsec. duration, for example) passes through coil *r* of core K2, but has no effect on M2 since core K2 is at "0." However, concurrently wth passage of the pulse *r*1 from M4 through coil *r* of K2, and subsequent to extinction of that pulse, the collector pulse from M1 passes through coil *d* of K2 in the opposite direction; and this latter current is effective to turn core K2 over from "0" to "1." Since this turnover is from "0" to "1," the voltage induced in coil *s* on K2 is of the incorrect polarity to cause M2 to conduct; hence the turnover is not opposed by coil *s* on K2.

Thus the change of K2 from "0" to "1" is relatively rapid and is accomplished prior to turnover of K1 from "1" to "0." Thus the information bit previously stored in K1 is shifted to K2.

The output pulse from M1, depicted as the pulse on waveform *m*1 in FIG. 2, endures substantially from time T1 to T3; and in passing through the drive coil *d* of core L2, temporarily reverses the latter from "0" to "1." This turnover is indicated on graph L2 in FIG. 2 at time T1–T3. At the termination of the mentioned pulse from the collector of M1, core L2 is returned by the bias thereon to "0," generating a triggering voltage for M5 in coil *s* on L2. M5 then conducts a pulse (indicated on waveform *m*5 at time T3) which temporarily drives core L1 to "1" as indicated on graph L1. Upon termination of the pulse from M5, L1 returns to "0" and M4 is thereby again triggered into conduction and produces a second reading pulse. The latter, shown as the second pulse, *r*2, of waveform *m*4 in FIG. 2, is ineffective at K1 because the latter is at "0"; but the pulse, passing through coil *r* on K2, causes triggering of M2. The latter transistor conducts, producing a pulse (see waveform *m*2 in FIG. 2) which, enduring after termination of pulse *r*2 from M4, drives K3 to "1" and slowly restores K2 to "0." Thus the stored bit is shifted from K2 to K3. Additionally, the pulse from M2 passes through coil *d* on control unit core L2 and initiates the previously described action of L2–M5 and L1–M4. The ensuing action, indicated on the graphs and waveforms of FIG. 2, includes passage of the third control pulse *r*3 from M4, the resultant triggering of M3, conduction through coil *f* of K3 and the resultant shift of the registered bit out of K3; all of this occurring in a manner previously made evident.

Figure 3:
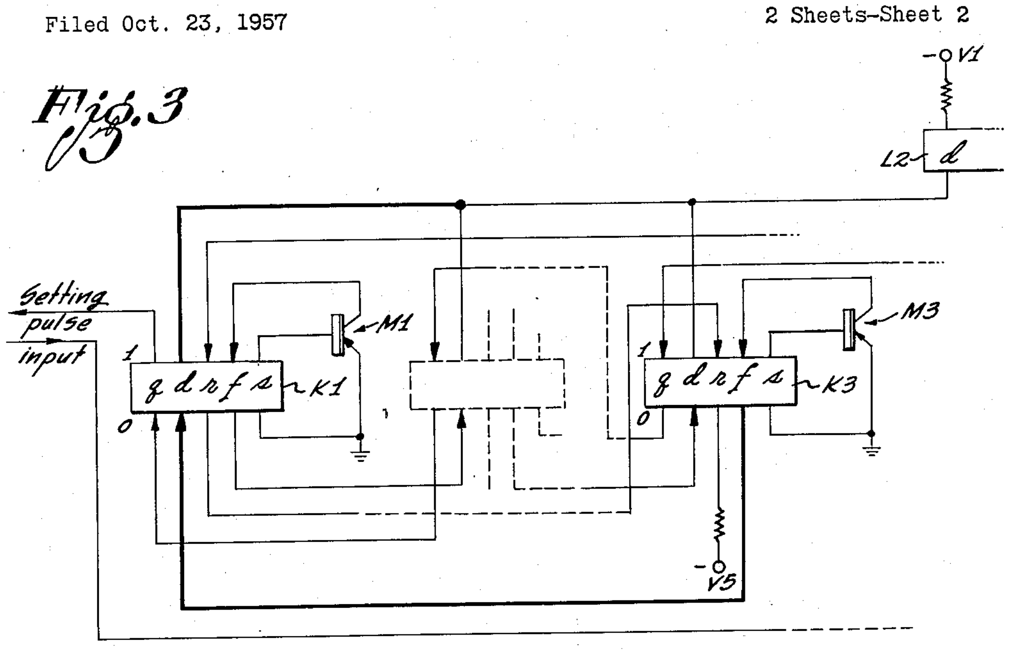
FIG. 3 is a sketch illustrating a modification of the circuit wiring and structure useful for providing a bit-circulating shifting register.

The information bit written into the register by the initial setting pulse, and shifted through the register, may be recovered in the form of an electric pulse from the lead connecting coil *f* of core K3 to potential source V4, and utilized in other apparatus. Alternatively, it may be recycled through the register by means of simple modifications hereinafter explained in connection with FIG. 3.

Graphs K1, K2, K3, L1, and L2 (in FIG. 2) diagrammatically represent the "0" and "1" states of the several correspondingly designated cores, with respect to time. Therein it will be noted that K1 is set to "1" state at time T0 by the setting pulse, and thus registers the information bit represented by the setting pulse. Before K1 is returned to "0," K2 is driven to "1," and the bit is then registered in K2, as indicated by graph K2. Then before K2 is returned to "0," K3 is driven to "1" and the bit thereby registered in the latter core, this being represented in graph K3. Comparison of graphs K1, K2, K3 indicates the manner in which the bit, in effect, "moves" or is shifted through the register with passage of time, and how the shifts of the bit occur during the initial periods of the output pulses of the respective transistors M1, M2, M3 as represented by the respective waveforms *m*1, *m*2, and *m*3 in FIG. 2.

From the preceding description it becomes evident to those skilled in the art that the "length" of the register may be increased by addition of additional core-and-transistor register units similar to the K2–M2 unit. The additional units may be inserted between the K2–M2 and K3–M3 units. Thus a shifting register of any desired number of units or stages may be constructed within the concept of the invention. Further, by extending the lead interconnecting coil *f* on core K3 and potential source V4 so as to include in series a driving coil on core K1, the register may be made to recirculate a bit therethrough indefinitely. The necessary change in the circuitry is indicated by heavy lines in FIG. 3, wherein it may be noted that the collector pulse output from M3 passes through feedback coil *f* on core K3 as previously, but also is routed to energize drive coils *d* on cores K1 and L2. Thus, before the bit is shifted out of K3, it is again registered in K1 by the pulse *m*3 driving the latter core from "0" to "1"; and the pulse in passing through coil *d* on core L2 reinitiates action of the control unit and the series of bit-shifting actions. As in the case of the apparatus depicted in FIG. 1, the recirculating shifting register provided by the modified circuitry of FIG. 3 may be of any desired length. For a longer register, the required additional core-and-transistor units are inserted in the register circuitry in the manner previously described.

It is evident that the physical structures embodied in the register may be of various types, within the spirit and scope of the invention as defined by the appended claims. While toroidal bistable magnetic cores are preferred, other types may be employed. The coils, and energizing currents and voltages may be selected in accordance with well-known principles of electronic design. It is evident that the ampere-turns provided in the case of each of coils *q* and *p* of core L1, and of coil *d* of core L2, must be such as will sufficiently override the coercive force produced by the ampere-turns provided by the biasing current and respective biasing coils, to reverse the magnetization states of those cores at the prescribed times. Resistors R*d*, R*b*, and R*p* and the potential source or sources are selected to be of values to ensure that action. Since loading and "hole storage" effects are relied upon in the operation of register units K1–M1, K2–M2, and K3–M3 to provide an appreciable duration of driving pulse for coercing a core from "1" to "0," subsequent to termination of the reading pulse produced by M4, the transistors of the register unit should be of "audio," i.e., low frequency, type. Exemplary values and types of components for a register may be as hereinbefore indicated and/or as noted on FIG. 1; but it is to be understood that components of other manufacturers and values may be used.

There having been disclosed a preferred form and physical embodiment of the invention, it is evident that in the light of the disclosure changes and modifications will occur to those skilled in the art, and accordingly it is not desired that the invention be limited to the particular preferred embodiment disclosed.

What is claimed is:

1. A self-sequencing electronic single-bit shift register device comprising: a plurality of serially designated bistable magnetic elements each capable of being forced into either from the other of two opposite remanent magnetic states representable as "0" and "1," respectively, and each element being further capable of registering an information bit therein by existence in state "1" and absence of a bit therein by existence in state "0"; means effective to concurrently force the first of said elements to "1" and the remaining elements to "0," to register a bit in the first element for subsequent shifting through the register; asynchronous means, including conductor means inductively linked to said elements, for producing asynchronous shift pulses in response to the switching of said elements from "1" to "0" and utilizing a first shift pulse to force the second element from "0" to "1" and force the first element from "1" to "0," and thereafter utilizing a second shift pulse to force the third element from "0" to "1" and the second element from "1" to "0" and thereafter utilizing a third shift pulse to force the third element from "1" to "0" state; whereby an information bit registered in said first element by said first mentioned means is thereafter registered directly in successive order in the second and third of said elements.

2. A self-sequencing electronic shift register comprising: a plurality of bistable magnetic cores comprising respective first, second and third cores, each of the cores being capable of being coerced from either of first and second remanent states to the opposite remanent state, said first and second remanent magnetic states being arbitrarily representable by "0" and "1," respectively; individual sets of coils, one set for and on each respective core of said magnetic cores, each set of coils comprising first, second, and third individual coils; means to initially coerce said first core to "1" and said second and third cores to "0" to register an information bit in said first core; first, second, and third transistors each having a base, an emitter and a collector and first, second, and third terminals, each transistor being associated with a respective one of said magnetic cores and having two terminals connected to the ends of the first coil on the associated core and a terminal connected to pass transistor collector current through the second coil on the associated core to reverse the state of that core by conduction in the transistor; and control means activatable both by said first named means at the termination of the registration of said bit and also by a change of state from "1" to "0" of either of the first and second of said magnetic cores, and effective upon activation to pass a pulse through the third coil of each of said cores in a direction to coerce any core in "1" state to "0" state; whereby said information bit is successively shifted from said first core to said second core, from said second core to said third core, and from said third core.

3. An electronic circuit comprising: a bistable magnetic element capable of assuming each of first and second remanent states respectively designated "0" and "1"; first, second, and third coils inductively related to said element; means to initially coerce said element to "1"; a low frequency transistor having a base, an emitter and a collector, and first, second, and third terminals; means connecting said second coil to one of said terminals to conduct collector current of said transistor in a direction tending to coerce said element to "0"; means connecting the other two of said terminals across said first coil in a direction permitting current flow therethrough and through said transistor to inductively load said element incident to flow of collector current through said second coil, whereby said element may be only relatively slowly coerced from "1" to "0" by action of said collector current; and means including a pulse-producing control means for producing and passing a pulse through said third coil, for initiating conduction in said transistor.

4. An electronic shift register unit comprising: a bistable magnetic element capable of assuming each of first and second remanent states respectively designated "0" and "1"; first, second, and third coils inductively coupled to said element; means for initially coercing said element to "1"; a low frequency transistor having a base, an emitter and a collector and first, second, and third terminals; means connecting said second coil to one of said terminals to conduct collector current of said transistor in a direction tending to coerce said element to "0"; means connecting the other two of said terminals across said first coil in a direction permititng induced current flow therethrough and through said transistor to inductively load said element incident to flow of collector current through said second coil, whereby said element is only relatively slowly coerced from "1" to "0" by action of said collector current; and means including said third coil for producing a potential across said first coil, for initiating conduction in said transistor.

5. An electronic shift register unit comprising: a bistable magnetic element capable of assuming each of first and second remanent states respectively designated "0" and "1"; first and second coils inductively related to said element; means to initially coerce said element to "1"; a low frequency transistor having a base, an emitter and a collector, and first, second, and third terminals; means for initiating conduction in said transistor; means connecting said second coil to one of said terminals to conduct the collector current of said transistor in a direction tending to coerce said element to "0"; and means connecting the other two of said terminals across said first coil in a direction permitting induced current flow therethrough and through said transistor to inductively load said element incident to flow of collector current through said second coil, whereby said element is only relatively slowly coerced from "1" to "0" by action of said collector current.

6. An electronic shift register unit comprising: a bistable magnetic element capable of assuming each of first and second remanent magnetic states arbitrarily representable by "0" and "1," respectively; first, second, and third coils inductively coupled to said magnetic element; means to initially force said element to "1"; a low frequency transistor having a base, an emitter and a collector and first, second, and third terminals; means including said third coil for inducing a transistor triggering potential in said first coil for initiating conduction in said transistor; means connecting said second coil to one of said terminals to conduct current flowing through said transistor in a direction tending to force said element to "0"; and means connecting the other two of said terminals across said first coil in a direction permitting induced current flow therethrough and through said transistor to inductively load said element incident to flow of collector current through said second coil, whereby said element is only relatively slowly forced from "1" to "0" by action of said current.

7. An electronic shift register unit comprising: a bistable magnetic device capable of rapid change from each of first and second opposite remanent states to the other and capable of relatively slow reversal of state when subjected to damping action provided by an inductive load thereon; means to force said device to said first remanent state; a transistor having first, second and base terminals; a source of potential for said transistor; a first coil in inductive relation to said device and means connecting said coil across said first and base terminals, whereby upon commencement of a change of state of said device a potential is induced in said coil and applied across said first and base terminals; a second coil inductively related to said device and means connecting said second terminal, said second coil and said source of potential in series whereby current therethrough incident to transistor conduction tends to change said device from said first state to said second state; and means to induce a voltage across said first coil to excite said transistor into conduction; whereby when said transistor conducts, current therethrough passing through said second coil causes only relatively slow reversal of state of said device due to the inductive loading of said first coil.

8. A shift register for use in electronic digital computer devices, comprising: a plurality of serially designated bistable magnetic elements each capable of being coerced alternately to each of opposite remanent magnetic states representable as "0" and "1," respectively, and each element being capable of registering an information bit therein by existence in "1" and absence of a bit therein by existence in "0"; first means for registering an information bit in the first element by coercion of that element to "1"; second means, including means inductively coupled to the first and second of said elements, effective to cause relatively rapid coercion of the second element to "1" while causing relatively slow reverse coercion of the first element to "0," whereby to directly shift the registered bit from the first to the second of said elements; said second means including means inductively coupled to the second and third of said elements, and effective subsequent to coercion of said second element to "1" to cause relatively rapid coercion of the third element to "1" while causing relatively slow reverse coercion of the second element to "0," whereby to directly shift the registered bit from the second to the third of said elements; said second means also including means to continue shifting of the registered bit in similar manner to and from successive of said elements; whereby said bit is registered in and shifted through the plurality of said magnetic elements.

9. A register according to claim 8, including means inductively coupling the last and first of said magnetic elements and effective to re-register the bit in said first element by direct transfer by relatively rapid coercion of said first element from "0" to "1" during relatively slow coercion of said last element from "1" to "0," whereby said bit is recirculated through the shift register.

10. An electronic pulse generator effective to produce an amplified short-duration pulse in response to termination of flow of an electric current, comprising: a bistable magnetic element capable of being coerced to each from the other of two opposite remanent magnetic states arbitrarily representable by "0" and "1"; first and second coils inductively coupled to said element; a transistor having a base, an emitter, and a collector, and having respective first, second and third terminals; means including a resistor serially connecting said base, first terminal and said first coil to one of said second and third terminals; a pulse output circuit connected to the other of the terminals; means to energize said second coil to normally coerce said element to "0"; and means utilizing the flow of said electric current to overcome the coercive effect of energization of said second coil and coerce said element to "1"; whereby upon termination of said current said element is reversely coerced to "0" and induces a voltage effective on the base of said transistor to cause the latter to conduct and provide an amplified short-duration pulse in said output circuit.

11. A shift register, comprising: a series of bistable magnetic elements including at least first, second and third such elements, each of said elements being capable of being coerced to either from the other of opposite remanent magnetic states representable as "0" and "1," respectively, and each such element being capable of registering an information bit therein by existence in "1" and capable of registering absence of a bit therein by existence in "0"; first means for contemporaneously registering an information bit in said first element by coercion of that element to "1" and registering an absence of an information bit in each of the remainder of said elements by coercion to "0" of any of said remainder of said elements existing in "1"; second means including an electronic pulse generator means, and including means inductively coupled to the first and second of said elements and effective to cause relatively rapid coercion of the said second element to "1" while causing relatively slow reverse coercion of the said first element to "0" whereby to directly shift the registered bit from the first to the second of said elements, and said second means further including means inductively coupled to the second and the third of said elements and effective subsequent to coercion of said second element to "1" to cause relatively rapid coercion of the third element to "1" while causing relatively slow reverse coercion of the second element to "0" whereby to directly shift the registered bit from the second to the third of the said elements, and said second means also including means to continue shifting of the registered bit in similar manner to and from successive of said elements whereby said bit is registered in and shifted through a plurality of said elements; said pulse generator means providing electric pulses effective to time the successive shifting of said bit from element to element of said series in response to termination of flow of a current, and comprising (*a*) an additional bistable magnetic element capable of being coerced to each from the other of two opposite remanent states arbitrarily representable by "0" and "1," (*b*) first and second coils inductively coupled to said additional element, (*c*) an additional transistor having a base, an emitter, and a collector and having respective first, second and third terminals, (*d*) means including a resistor serially connecting said base, said first terminal and said first coil to one of said second and third terminals, (*e*) a pulse output connected to the other of said terminals and arranged to direct the output pulses through windings of at least the said first, second and third elements in a direction to tend to coerce those elements toward "0," (*f*) means to energize said second coil to normally coerce said additional element to "0," and (*g*) means including means supplying said current and means utilizing the flow of said current to overcome the coercive effect of energization of said second coil and coerce said additional element to "1" whereby upon termination of said current said additional element is reversely coerced to "0" and induces a voltage effective on the base of said additional transistor to cause the latter to conduct and provide an amplified short-duration pulse in said output circuit for tending to coerce one of said series of elements from "1" to "0."

12. A shift register according to claim 11, comprising means dependent upon and effective incident to coercion of one of said series of elements from "1" to "0" to provide said current as a pulse of electric current, whereby said register operates as an asynchronous self-sequencing single-bit shift register.

13. A shift register according to claim 12, in which means are provided whereby incident to coercion of the last one of said series of elements from "1" to "0," the said first element is coerced from "0" to "1" whereby said register operates as a recirculating shift register.

14. A self-sequencing electronic shift register device comprising: means including electric energy means, and a plurality of bistable magnetic elements each coercible from either to the other of opposite remanent magnetic states and functionally arranged in a series; other two-state means normally biased to a second of first and second states and including circuit means which when energized are effective to shift the said other two-state means to the said first state thereof against the bias thereof, and effective to provide an electric output pulse when coerced to said second state; means, including winding means inductively linked to respective ones of said elements, and connecting means connecting a winding means linked to one of said elements to winding means linked to the next element thereto in the series of said elements and connected to said energy means and said circuit means, whereby upon coercive reversal of state of said one of said elements the said next element thereto is oppositely coerced and said circuit means energized; and means, including connections and respective windings inductively linked to said magnetic elements and connected to receive a said electric output pulse from said other two-state means, arranged to return to its first state any such oppositely coerced one of said plurality of bistable magnetic elements.

15. A device according to claim 14, in which said other two-state means comprises bistable magnetic elements means normally biased to the second of first and second remanent states.

References Cited in the file of this patent

UNITED STATES PATENTS

| | | |
|---|---|---|
| 2,644,893 | Gehman | July 7, 1953 |
| 2,652,501 | Wilson | Sept. 15, 1953 |
| 2,683,819 | Rey | July 13, 1954 |
| 2,708,722 | An Wang | May 17, 1955 |
| 2,747,110 | Jones | May 22, 1956 |
| 2,863,138 | Hemphill | Dec. 2, 1958 |